US007437418B2

(12) United States Patent
Oswald

(10) Patent No.: US 7,437,418 B2
(45) Date of Patent: Oct. 14, 2008

(54) SCHEDULING SYSTEM FOR PERIPHERAL READINESS PROTOCOL

(75) Inventor: Tommy Lee Oswald, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 954 days.

(21) Appl. No.: 10/611,592

(22) Filed: Jun. 30, 2003

(65) Prior Publication Data

US 2004/0267888 A1  Dec. 30, 2004

(51) Int. Cl.
G06F 15/16 (2006.01)
(52) U.S. Cl. ............... 709/206; 709/207; 709/225; 709/227; 709/228; 709/229; 358/1.1; 710/19
(58) Field of Classification Search ........... 709/206, 709/207, 225, 227–229; 710/19; 358/1.1
See application file for complete search history.

(56) References Cited

U.S. PATENT DOCUMENTS

| | | | |
|---|---|---|---|
| 5,714,995 | A | 2/1998 | Wiklof et al. |
| 5,930,551 | A | 7/1999 | Nakazato et al. |
| 6,231,154 | B1 | 5/2001 | Corrigan |
| 6,390,582 | B1 | 5/2002 | Laharaty et al. |
| 7,136,175 | B2 * | 11/2006 | Anderson et al. ......... 358/1.14 |
| 7,142,321 | B2 * | 11/2006 | Tomita et al. ............. 358/1.15 |
| 2002/0085053 | A1 | 7/2002 | Kao et al. |
| 2002/0085056 | A1 | 7/2002 | Ylitao et al. |
| 2002/0112184 | A1 * | 8/2002 | Hall et al. .................. 713/201 |
| 2002/0140960 | A1 * | 10/2002 | Ishikawa .................. 358/1.13 |
| 2002/0140986 | A1 * | 10/2002 | Takayama ................. 358/402 |
| 2002/0140987 | A1 * | 10/2002 | Ishikawa .................. 358/402 |
| 2002/0144026 | A1 * | 10/2002 | Dunlap et al. ............. 710/16 |
| 2003/0012415 | A1 * | 1/2003 | Cossel .................. 382/124 |
| 2003/0023696 | A1 * | 1/2003 | Aikawa et al. ............ 709/206 |
| 2003/0025935 | A1 * | 2/2003 | Somei .................. 358/1.15 |
| 2003/0135564 | A1 * | 7/2003 | Tsuchiya ................. 709/206 |
| 2003/0149917 | A1 * | 8/2003 | Smith et al. ............... 714/38 |
| 2003/0200266 | A1 * | 10/2003 | Henry .................... 709/206 |
| 2003/0233414 | A1 * | 12/2003 | Henry .................... 709/206 |
| 2004/0021889 | A1 * | 2/2004 | McAfee et al. ............ 358/1.13 |
| 2004/0083268 | A1 * | 4/2004 | Shukla .................... 709/206 |
| 2004/0150851 | A1 * | 8/2004 | Sato ...................... 358/1.13 |
| 2004/0194026 | A1 * | 9/2004 | Barrus et al. ............. 715/515 |
| 2004/0203662 | A1 * | 10/2004 | Boldon .................. 455/414.1 |
| 2004/0252280 | A1 * | 12/2004 | Paige et al. .............. 352/41 |
| 2004/0263899 | A1 * | 12/2004 | Ferlitsch ................. 358/1.15 |
| 2005/0036167 | A1 * | 2/2005 | Atsumi ................... 358/1.15 |

FOREIGN PATENT DOCUMENTS

| JP | 62128767 | 6/1987 |
|---|---|---|
| JP | 2000165302 | 6/2000 |

* cited by examiner

Primary Examiner—David Wiley
Assistant Examiner—Alina N. Boutah
(74) Attorney, Agent, or Firm—David C. Ripma

(57) ABSTRACT

A scheduling system for an MFP to provided scheduled readiness of the MFP includes an MFP having an EMail address associated therewith; an EMail system for generating user EMAILS and transmitting the generated EMAILS; a readiness specification which is contained in a user-generated EMail and which sets parameters controlling the readiness of the MFP; an acknowledgment mechanism in the MFP for generating a reply EMail, indicating that the readiness specification has been received and entered; and an error message generator in the MFP for generating a reply EMail indicating that the readiness specification has not been entered.

6 Claims, 1 Drawing Sheet

SCHEDULING SYSTEM FOR PERIPHERAL READINESS PROTOCOL

FIELD OF THE INVENTION

This invention relates to the use of multi-function peripherals (MFPs), and specifically to a scheduling system for providing a warming session to insure MFP readiness use upon demand.

BACKGROUND OF THE INVENTION

It is inconvenient and wasteful for a user to have to wait while an output devices, such as a multi-function peripheral (MFP) is warming before it can be used. The wait time is wasteful of individual resources, as the wait time is essentially down-time, which could be otherwise put to productive use. For example, if a user schedules a meeting and is aware that the participants will need copies of various materials that will be distributed at the meeting, the user can insure that a predetermined MFP will be warmed and ready to function a few minutes before the meeting. Alternatively, the user can schedule standing "warming times" with a MFP, that may correspond to standing meetings on the user's outlook calendar.

The wait-time problem is solved in the prior art, at least in part, by allowing an administrator of an MFP to modify the power save mode on the MFP. For example, the MFP can be set to remain active, i.e., not power off, even if it is not in use, eliminating the need for a warming cycle. Alternatively an MFP user can send a "warm-up" command to the MFP, as described in U.S. Pat. No. 5,930,551, to Nakazato et al., granted Jul. 27, 1999, for Printing system alleviating timing problems due to warm-up and paper outage, describes a printing system alleviating timing problems due to warm-up and paper outage. According to a second aspect of the invention, before starting to prepare the data for the first page, the host computer sends the MFP a warm-up command, causing the MFP to commence preparations for printing. This warm-up command however is sent just prior to printing and is not scheduled.

U.S. Pat. No. 5,714,995 to Wiklof et al., granted Feb. 3, 1998, for Thermal printhead with enhanced remote voltage sense capability, describes a thermal printhead which is formed on a substrate. Plural of thermal print elements in the thermal printhead are formed in a linear array, wherein each of the plural thermal print elements is respectively connected to a plurality of common electrode traces and a plurality of ground electrode traces. The common electrode traces are switchably connected to a single common electrode and the ground electrode traces are connected to a single ground electrode.

U.S. Pat. No. 6,231,154 to Corrigan, granted May 15, 2001, for Thermal ink jet print head and temperature control apparatus and method, describes a thermal ink jet print head with numerous firing elements on a die, and a temperature sensor on the die with a sensor voltage output proportional to a sensed temperature. A digital to analog converter has a digital input and an output voltage proportional to the value of a digital word received by the digital input, and a comparator has a first input connected to the sensor voltage output and a second input connected to the converter voltage output.

U.S. Pat. No. 6,390,582 to Laharaty et al., granted May 21, 2002, for Method for reducing thermal aging in an ink jet print head, describes a technique for reducing thermal aging in an ink jet print head while avoiding significant warm-up times. The method uses multiple print head standby temperatures to reduce the effects of thermal aging over time. The ink for the printer is a phase change ink. The ink jet printer has a print head, the print head printing at a first print temperature and the print head standing by a different second standby temperature lower than the first print temperature. The ink is ejected from the print head by applying a voltage to a transducer. The method includes monitoring the time the printhead is at the second standby temperature, calculating a thermal aging period for the print head at the standby temperature, and at a predetermined value for the thermal aging period, increasing the voltage applied to the transducer when ink is ejected, the voltage being increased at a predetermined rate.

U.S. Patent Application Publication 20020085053 to Kao et al., granted Jul. 4, 2002, for Method and apparatus for use in ink jet printing for reducing thermal accumulation during inkjet printing, describes a method and apparatus for use in inkjet printing. The apparatus includes a memory, a heat accumulation calculation device, and an image separating device. The memory is used to store a heat weighting look-up table. When data representative of the image is fed into the heat accumulation calculation device, a heat weighting for the image can be calculated according to the heat weighting look-up table, which can be used to determine the degree of heat accumulation during printing. The image separating device then outputs pieces of image data representing sub-images according to the heat weighting for the image. Finally, the image is formed by printing the sub-images successively according to the pieces of image data. In addition, for some regions where serious heat accumulation is predicted, the densities of the pixels to be printed within the regions can be adjusted to reduce the degrading effect on the printing quality due to the heat accumulation during printing.

U.S. Patent Application Publication 20020085056 to Ylitalo, granted Jul. 4, 2002, for Method and apparatus for selection of inkjet printing parameters, describes Methods and apparatus for inkjet printing include automated techniques for selecting and/or adjusting printing parameters. The techniques include methods for altering test pattern images received on a substrate for assessing certain characteristics, such as adhesion of a particular ink to a particular substrate. A computer selects certain printing parameters based on an assessment of the altered test pattern images.

SUMMARY OF THE INVENTION

A scheduling system for an MFP to provided scheduled readiness of the MFP includes an MFP having an EMail address associated therewith; an EMail system for generating user EMails and transmitting the generated EMails; a readiness specification which is contained in a user-generated EMail and which sets parameters controlling the readiness of the MFP; an acknowledgment mechanism in the MFP for generating a reply EMail, indicating that the readiness specification has been received and entered; and an error message generator in the MFP for generating a reply EMail indicating that the readiness specification has not been entered.

It is an object of the invention to provide a scheduling mechanism to insure that an MFP is ready to function on demand.

Another object of the invention is to provide an EMail scheduling mechanism for an MFP.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

Figure 1:
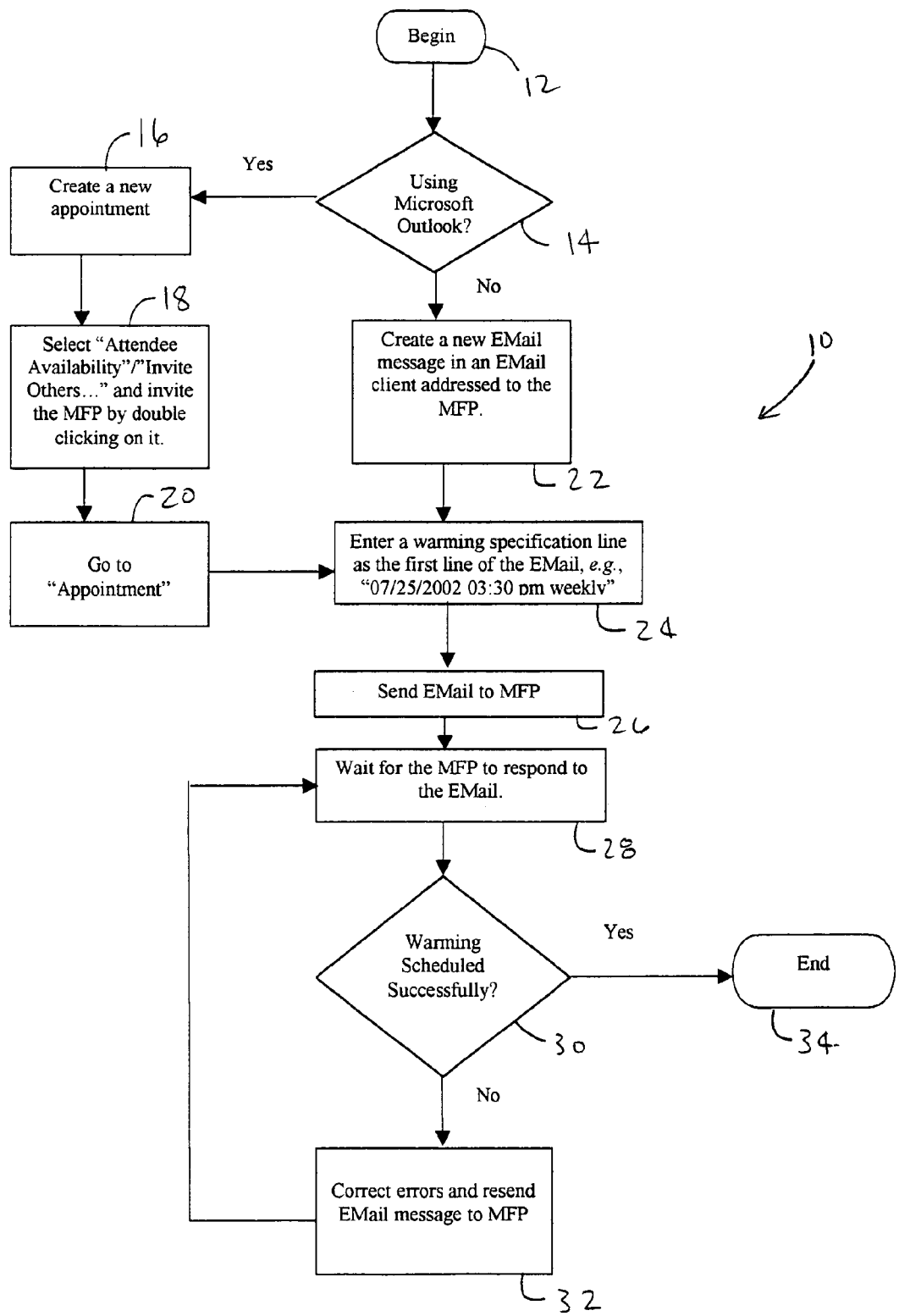
FIG. 1 is a block diagram of the invention.

The invention solves the above-described warm-up problem by allowing a user to schedule an MFP for warming before the user needs to use the MFP. The scheduled warming may be repetitive or a one-time event.

This invention differs from prior art in that the user does not need to remember to send a warming command to the MFP. The MFP will remember to warm itself, and be ready for use. This is particularly convenient in the case of repetitive events. The prior art requires that a user remember to send a warming command before each event requiring MFP readiness. This invention does away with that necessity, in that it does not require administrative intervention. Administrators will appreciate the freedom provided by the system of the invention, which does not require administrators to respond to user requests to adjust MFP parameters.

An MFP associated with the scheduling system is assigned an EMail address. An EMail system is provided, which allows a user to generate EMAILS and then transmit the EMails to other users, workgroup members, and the MFP. The user schedules a warming session with the MFP by sending an EMail to the MFP from any EMail client. The body of the EMail includes a starting command, or readiness specification, such as:

mm/dd/yyyy    hh:mm    [am|pm]    [repeat [daily|weekly|monthly|yearly]]

which sets parameters for controlling the readiness of the MFP.

If Microsoft Outlook™ is used, the user schedules a meeting using the MFP as a resource. Each MFP has an EMail address, which provides an identity Outlook can use for scheduling. The user provides the date/time specification depicted above in the first line of the body of the EMail.

The MFP parses the EMail received from the EMail client and schedule the warming session with the timer queue provided by the particular RTOS real-time operating system (RTOS) of the MFP. The details of scheduling with the RTOS are specific to each RTOS. The MFP is programmed to accept all appointments. If a previous appointment is scheduled, the MFP will use the previous appointment in place of the new appointment, as the MFP will already be scheduled to be active, with the one exception that the most repetitive specification is used. For example, if a warming appointment already exists for 4:30 P.M. everyday, then a new appointment for 4:30 P.M. has no effect on MFP warming. However, if a single warming appointment already exists for 4:30 P.M. and the new 4:30 P.M. appointment is to be repeated daily, the single event appointment will be discarded in favor of the new, repetitive appointment.

The MFP includes an acknowledgment mechanism which generates and sends a reply EMail acknowledgment to the sender via SMTP, with the body of the EMail stating, e.g.:

Warming appointment accepted which indicates that the readiness specification has been received and entered in the MFP.

The MFP also includes an error message generator which, if the MFP is not able properly to parse the user's appointment string, responds with an error message indicating that the readiness specification has not been entered, e.g.:

<Users original warming appointment string>

Appointment parse error—please use following format.
mm/dd/yyyy    hh:mm    [am|pm]    [repeat [daily|weekly|monthly|yearly]]

The system of the invention allows for other sources to schedule warming sessions besides EMail, e.g., MFP front panel, SNMP, etc. This provides multiple access protocols for scheduling warming sessions, by having the routines which handle the EMail messaging only deal with the EMail interface. Such routines call other routines which parse, schedule and reply as to whether the scheduling is successful. Each access protocol has its own code which responds to the user over the particular interface.

FIG. 1 illustrates the logic for the scheduling system of the invention, generally at 10. In one embodiment of the invention, Microsoft Outlook™ may be used to schedule a warming session with a MFP. Another embodiment of the invention may utilize any EMail client. The scheduling system is initiated at "Begin," block 12. The system inquires whether Microsoft Outlook™ is in use, block 14, and if yes, a new appointment is scheduled, block 16. The EMail address for the MFP is obtained, block 18, by selecting "Attendee availability/invite others," and preparation is made to enter the warming specification as an EMail message, block 20. If Microsoft Outlook™ is not in use, the user specifies the EMail address of the MFP, block 22, enters the warming specification to be parsed by the MFP, block 24, and sends the EMail to the MFP, block 26.

The user waits for the MFP to send a reply to the appointment, block 28. The user checks the reply EMail message from the MFP, block 30, to determine if the event has been scheduled. If the scheduling has not been successful, the user corrects any errors and resends the EMail message to the MFP again, block 32, and again waits for the MFP's reply, block 28. Blocks 30, 32 and 28 are repeated until the MFP responds with a successful scheduling reply. When a successful scheduling reply is received, the user is finished, and the scheduling system ends its operation, block 34.

Thus, a scheduling system for an MFP has been disclosed. It will be appreciated that further various and modifications thereof may be made within the scope of the invention as defined in the appended claims.

I claim:

1. A scheduling system for an MFP to provide scheduled readiness of the MFP, comprising:
   an MFP having an EMail address associated therewith;
   an EMail system for generating user EMAILS and transmitting the generated EMAILS;
   a readiness specification which is contained in a user-generated EMail and which sets parameters controlling the readiness of the MFP;
   an acknowledgment mechanism in the MFP for generating a reply EMail, indicating that the readiness specification has been received and entered; and
   an error message generator in the MFP for generating a reply EMail indicating that the readiness specification has not been entered.

2. The system of claim 1 wherein the EMail system includes Microsoft Outlook™.

3. The system of claim 1 wherein said readiness specification includes a starting command.

4. The system of claim 3 wherein said starting command has the form: mm/dd/yyyy hh:mm [am|pm] [repeat [daily|weekly|monthly|yearly]], which sets parameters for controlling the readiness of the MFP.

5. A scheduling system for an MFP to provide scheduled readiness of the MFP, comprising:
- an MFP having an EMail address associated therewith;
- an EMail system for generating user EMAILS and transmitting the generated EMAILS;
- a readiness specification which is contained in a user-generated EMail and which sets parameters controlling the readiness of the MFP, including a starting command having the form: mm/dd/yyyy hh:mm [am|pm] [repeat [daily|weekly|monthly|yearly]];
- plan acknowledgment mechanism in the MFP for generating a reply EMail, indicating that the readiness specification has been received and entered; and
- an error message generator in the MFP for generating a reply EMail indicating that the readiness specification has not been entered.

6. The system of claim 5 wherein the EMail system includes Microsoft Outlook™.

* * * * *